United States Patent [19]

Stooss

[11] 3,897,536

[45] July 29, 1975

[54] PROCESS FOR THE MANUFACTURE OF A FRAME-WORK MEMBER OF A HOROLOGICAL DEVICE

[75] Inventor: Rodolphe Stooss, Le Landeron, Switzerland

[73] Assignee: Ebauches Electroniques S.A., Switzerland

[22] Filed: Sept. 25, 1973

[21] Appl. No.: 400,625

Related U.S. Application Data

[63] Continuation-in-part of Ser. No. 192,080, Oct. 26, 1971, abandoned.

[30] Foreign Application Priority Data

Dec. 11, 1970 Switzerland...................... 18344/70

[52] U.S. Cl. ................ 264/328; 264/156; 264/242; 264/250
[51] Int. Cl.² .......................................... B28B 1/24

[58] Field of Search ............ 264/328, 156, 242, 250

[56] References Cited
UNITED STATES PATENTS

| | | | |
|---|---|---|---|
| 2,915,789 | 12/1959 | Dykstra et al. ...................... 264/246 |
| 3,082,485 | 3/1963 | Thomas .......................... 264/242 X |
| 3,108,853 | 10/1963 | Short et al. ...................... 264/250 X |
| 3,591,669 | 7/1971 | Memory.............................. 264/242 |

*Primary Examiner*—Lester L. Lee
*Attorney, Agent, or Firm*—Edward T. Connors

[57] ABSTRACT

A process of making a base or bridge member for a horological device such as a watch, wherein the said member is injection moulded from a synthetic material containing a filling of reinforcing material, the member containing holes which are subsequently injection moulded with bearings of a further synthetic material having a low coefficient of friction.

9 Claims, 3 Drawing Figures

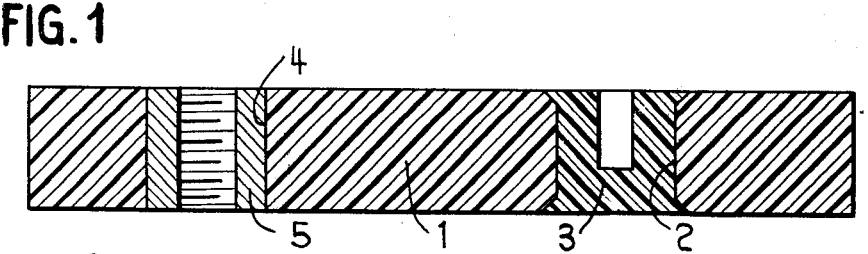
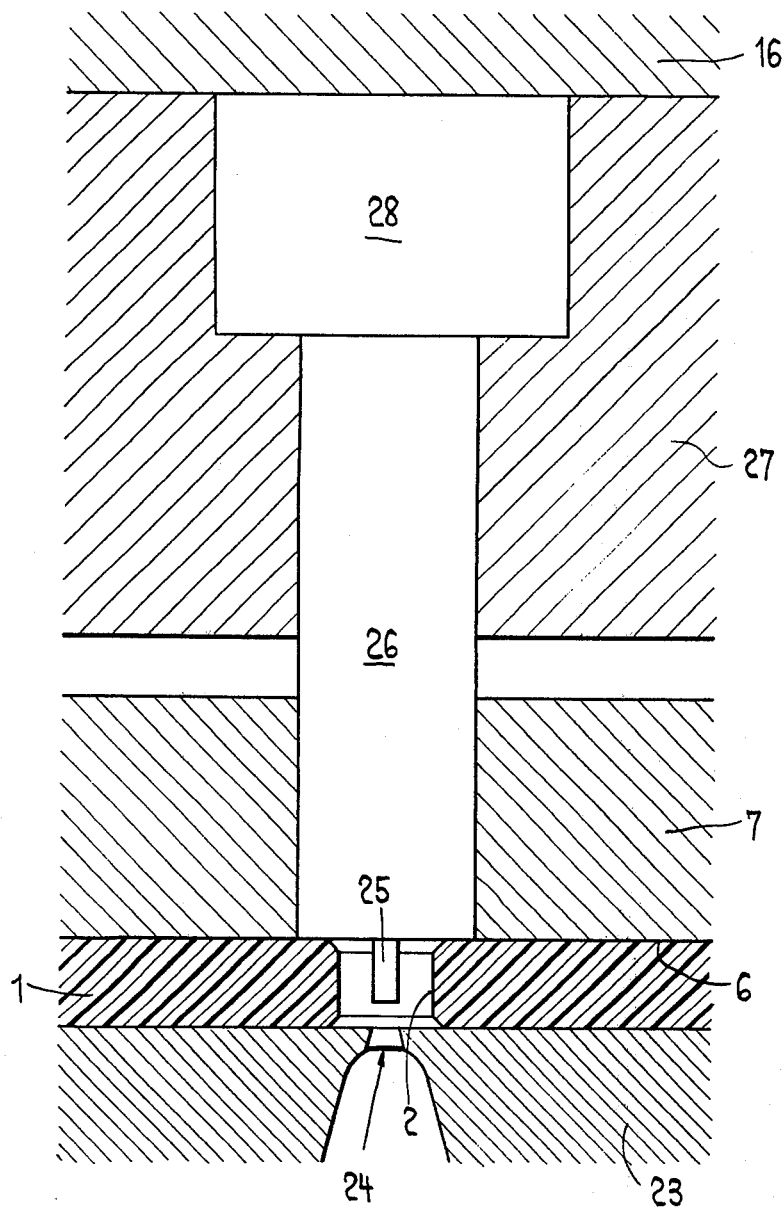

PROCESS FOR THE MANUFACTURE OF A FRAME-WORK MEMBER OF A HOROLOGICAL DEVICE

CROSS REFERENCE TO RELATED APPLICATION

This application is a continuation-in-part of application Ser. No. 192,080 filed Oct. 26, 1971 now abandoned.

BACKGROUND OF THE INVENTION

This invention relates to a novel process for the manufacture of a frame-work member of a horological device. By frame-work member is meant a bridge or work plate of a movement of a timepiece.

It has already been proposed to manufacture the base plates and the bridges of horological devices such as watches from plastics material. The materials used have not, however, given satisfaction. To obtain suitable bearings for the spindles of a horological device, it has been thought advisable to choose plastics materials presenting a small coefficient of friction, but these materials are not dimensionally stable or mechanically strong. As a result, such components became deformed after a short period of time and showed considerable wear, so that the functioning of the horological device is affected or even completely impaired.

SUMMARY OF THE INVENTION

The present invention remedies this fault, whilst using the inherent advantages of synthetic materials.

According to the present invention there is provided a process for the manufacture of a frame-work member of a horological device, comprising the steps of injection moulding in a mould said member from a synthetic material with a filling of glass fibres or balls, tungsten powder or bronze powder, using said mould to provide at least one hole at the point which is to receive a bearing, and thereafter injection moulding the inside of said hole with a synthetic bearing material presenting a small coefficient of friction. In this way suitable synthetic material may be used as well for the supporting structure of the frame-work member as for the bearing or bearings formed therein, the material used for the supporting structure being reinforced to obtain suitable strenth and stability and the bearing material having low friction and other suitable properties.

Further, injection moulding in two steps, first for moulding the supporting structure having at least one hole left for forming a bearing, and in a second operation for moulding the bearing in the prefabricated supporting structure makes it possible to mould the bearing or bearings under suitable conditions for obtaining the required accuracy on one hand and for preventing damaging of the extremely fine and weak portions required for moulding the bore of the bearing or bearings.

In fact such bores in watch bearings have a diameter in the order of 12/100 of a millimeter. During injection moulding of a bearing, a needle has to project into the moulding of a bearing is moulded for forming the hole wherein the bearing is moulded for forming the bore of the bearing, this needle having a diameter of the order mentioned above. It will be shown that under these extreme conditions the moulding operation has to be carried out under particular conditions.

BRIEF DESCRIPTION OF THE DRAWING

FIG. 1 shows, by way of example, a sectional view of a framework member resulting from the process according to this invention, FIG. 3 shows a part of FIG. 2 on a larger scale.

To manufacture a base plate or bridge 1 as shown in FIG. 1, a mould, FIGS. 2 and 3, is injected with a synthetic plastics material with a filling of glass fibres or glass balls. A suitable thermoplastics material is a polyphenylene resin "NORYL" (Reg.T.M.), but a thermosetting material can be used also. The base plate or bridge thus obtained has a high dimensional stability as well as a good rigidity and an excellent mechanical resistance. Moreover, it absorbs very little water.

Figure 2:
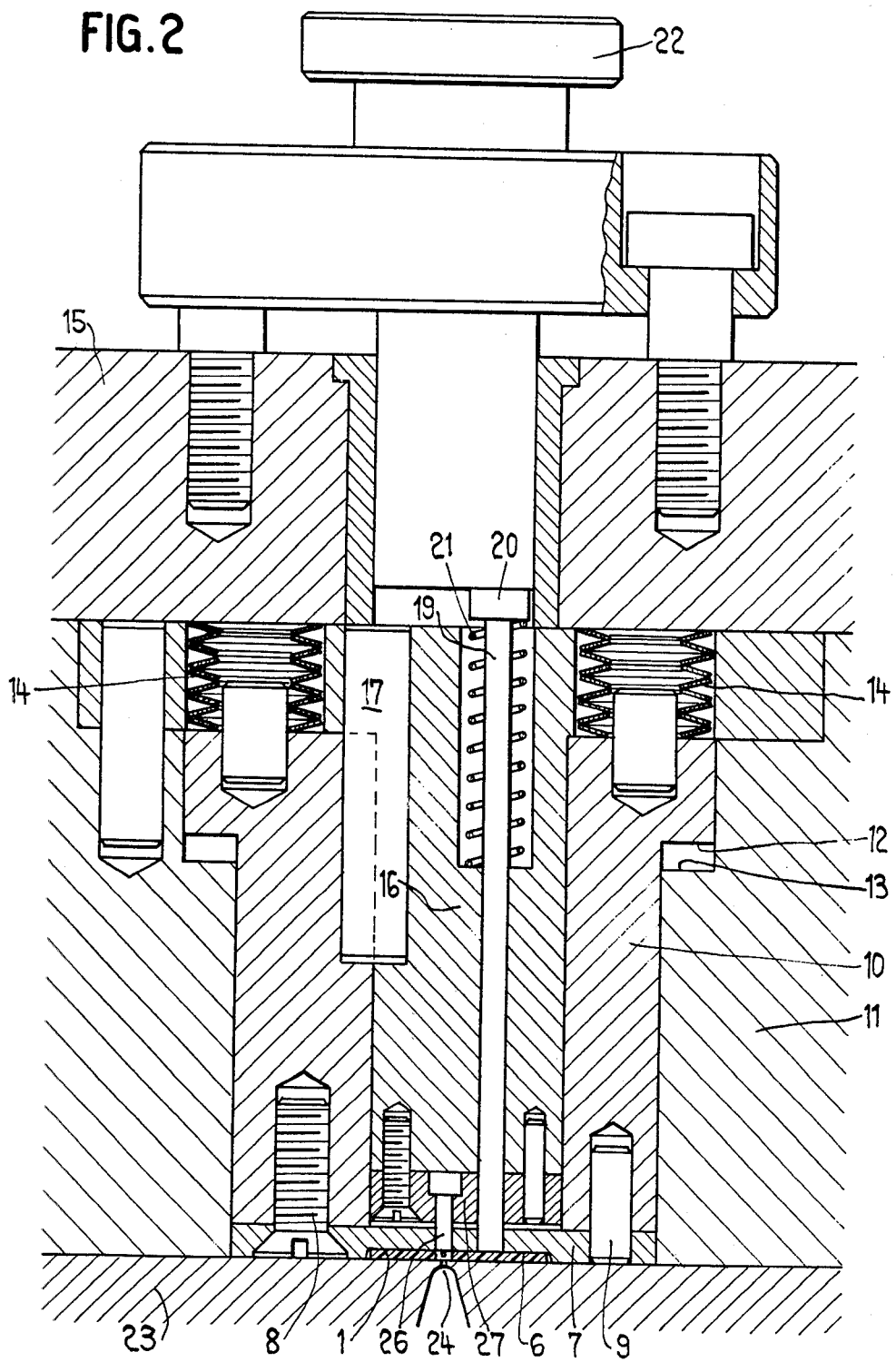
FIG. 2 is a partial sectional view of a mould for carrying out the process of this invention.

The mould used for the above injection process is provided with rods to form at least one hole 2 in the plate which passes right through, the hole being located at a point to receive a bearing for a spindle of the horological device.

In a second step of the process, the holes 2 are lined by moulding, with synthetic material presenting a small coefficient of friction, such as an acetal resin "DELRIN" (Registered Trade Mark). These linings provide self-lubricating bearings 3 for the said spindles.

During moulding of the base plate 1, other holes 4 may be moulded in which threaded bushings 5, preferably made of brass, may be inserted. These bushings 5 are adapted to receive screws, for example assembling or carrying screws. However, if the thickness of the base plate 1 is sufficient, the bushings 5 can be omitted and the threads may be cut directly into the plate.

The process described permits the manufacture of base plates and bridges in a very economical manner, since the long and complicated operations of turning, piercing and contouring associated with a metal frame, are no longer needed. These bridges and base plates are very stable and have an excellent mechanical resistance. Moreover lubrication is rendered superfluous.

The second step of the process, that is moulding of a bearing, and the essential portions of an injection-moulding apparatus will now be explained in more detail with reference to FIGS. 2 and 3. The base plate or bridge 1 shown partially in FIG. 1 and moulded of reinforced synthetic resin is placed in the cavity of an injection-moulding apparatus, this cavity being formed by a recessed portion 6 of a mould portion 7 fixed by means of a screw 8 and of a positioning pin 9 on a sleeve 10. Sleeve 10 is mounted for axial displacement in the bore of a mould portion 11, whereby shoulders 12 and 13 of portions 10 and 11 respectively form an abutment for the axial displacement of sleeve 10 downwards in FIG. 2. Plate springs 14 acting between a base plate 15 of the mould and sleeve 10 tend to displace sleeve 10 downwards until its shoulder 12 abuts against shoulder 13 of portion 11.

Sleeve 10 is guided by an anvil 16 positioned within the sleeve for relative axial displacement of the sleeve with respect to the anvil but the sleeve and anvil are interlocked against relative rotation by means of a pin 17 engaging without clearance into longitudinal grooves of sleeve 10 and anvil 16. Anvil 16 is anchored on plate 15.

An ejector pin 19 having a head 20 extends through bores of anvil 16 and mould portion 7. A spring 21 usually maintains the ejector pin 19 in its retracted position as illustrated. Pressure acting against an actuating head 22 is transmitted to the ejector pin 19 whereby it is displaced downwardly for ejection of the member 1 from the mould.

The mould cavity or recess 6 formed in mould portion 7 is closed by a plate 23 having an injection nozzle 24 for injection of suitable synthetic resin into a hole preformed in member 1 for receiving a bearing therein. The bore of this bearing is formed by a needle 25 extending into the recess 6 of mould portion 7. Needle 25 is formed at the free end of a pin 26 extending through a bore of mould portion 7 and of a plate 27 removably fixed on pin 16 by means of a screw and of a positioning pin. Pin 26 has a head 28 maintained in position between plate 27 and pin 16.

As clearly seen from FIG. 3, the needle 25 and the aperture of injection nozzle 24 are each coaxially disposed in the hole 2 wherein the bearing 3 is to be moulded. In this case the diameter of needle 25 is in the order of 12/100 of a millimeter and the diameter of the aperture of the injection nozzle 24 is in the order of 16/100 of a millimeter.

The injection mould as shown in FIGS. 2 and 3 is ready for injection of the bearing material. When this material is injected through nozzle 24, its impact onto the extremely thin and weak needle 25 is a symmetrical one such that the needle 25 cannot be bent or broken or otherwise damaged. This is extremely important not only for a high life time of the needle but also for obtaining the required accuracy of the position of the bore of the bearing injection moulded in the hole 2 round needle 25. Any flexion of this needle during injection would be detrimental to the accuracy which would no longer be sufficient for the standards required in watchmaking.

When the bearing has been moulded in hole 2 and the material has sufficiently solidified, opening of the mould is initiated by displacement of plate 15 upwards in FIG. 2. Thereby the anvil 16 which is rigidly coupled with plate 15 is displaced upwardly, carrying with it plate 27 and pin 26 with needle 25. Therefore, the first operation is to withdraw the extremely sensitive needle 25 from the mould as long as member 1 is still maintained in a predetermined position between parts 7 and 23, part 7 being firmly urged against part 23 by the plate springs 14 in spite of the initial displacement of plate 15. When shoulders 12 and 13 abut against each other upon further displacement of parts 15 and 11 upwardly, sleeve 10 and mould portion 7 fixed thereto are now displaced upwardly. The ejector pin 19 may now be actuated for ejection of member 1 from the recess 6 of mould portion 7. The mould is then completely opened for removing the finished member 1 and for inserting a new member 1 with a hole 2 for moulding therein a bearing 3 in the manner set out above.

While one bearing 3 and one bushing 5 have been shown by way of example in FIG. 1, the frame-work member may have more than one bearing and/or bushing. The high accuracy of the relative position of several bearings is warranted by the manufacturing method described above. It is readily seen from FIGS. 2 that the mould portion 7 and plate 27 together with pin 26 and needle 25 may easily be exchanged for adapting the mould for insertion of various forms of frame-work members with any desired shape and number and relative position of bearings to be moulded. Of course, plate 23 with the injection nozzle or nozzles may also be exchanged for adapting the mould for different forms of the frame-work member.

I claim:

1. A process for the manufacture of a frame-work member of a horological device comprising the steps of injection moulding said member from a synthetic material with a filling of reinforcing material while moulding at least one opening at a position which is to receive a bearing, thereafter injection moulding the inside of said opening with a synthetic bearing material presenting a low coefficient of friction using an injection mould with a bearing forming die needle positioned in said opening and an injection nozzle spaced therefrom and positioned coaxially to said needle, and moulding said bearing by impacting the injected synthetic bearing material against the end of said needle for the even distribution thereof without flexure of said needle while forming said bearing in said member.

2. The process according to claim 1 in which is incorporated the steps of withdrawing said needle from said formed bearing and thereafter ejecting said member from said mould.

3. A process in accordance with claim 1, wherein the synthetic material for the member is a thermoplastic or thermosetting plastics material.

4. A process in accordance with claim 1, wherein the bearing material is an acetal resin.

5. A process for the manufacture of a frame-work member of a horological device, comprising the steps of first injection moulding in a first mould said member from a synthetic material containing a filling of reinforcing material, using said mould to provide at least one hole at the point which is to receive a bearing, removing said member from said first mould and placing it into a second mould with said hole placed over a moulding needle fixed in said second mould and projecting into said hole, and thereafter injection moulding the inside of said hole with a synthetic bearing material presenting a small coefficient of friction whereby the bore of the bearing is moulded by said needle.

6. A process in accordance with claim 5, wherein the synthetic material for the member is a thermoplastic or thermosetting plastics material.

7. A process in accordance with claim 5, wherein the bearing material is an acetal resin.

8. A process in accordance with claim 5, in which said bearing is moulded by injection of said synthetic bearing material from said nozzle in a direction coaxial to said hole and to said needle respectively.

9. A process in accordance with claim 5, in which said needle is retracted from said material injected for forming the bearing before opening the injection mould and ejecting said member with said bearing moulded therein.

\* \* \* \* \*